June 21, 1960 G. M. R. WINKLER 2,942,203
OSCILLATOR STABILIZING SYSTEM HAVING PLURAL
PHASE LOCK CHANNELS CONTROLLED BY A
COMMON REFERENCE OSCILLATOR
Filed June 17, 1958

*INVENTOR,*
*GERNOT M. R. WINKLER.*
*BY* Harry M. Saragovitz
*ATTORNEY.*

United States Patent Office 2,942,203

Patented June 21, 1960

2,942,203

OSCILLATOR STABILIZING SYSTEM HAVING PLURAL PHASE LOCK CHANNELS CONTROLLED BY A COMMON REFERENCE OSCILLATOR

Gernot M. R. Winkler, Long Branch, N.J., assignor to the United States of America as represented by the Secretary of the Army Filed June 17, 1958, Ser. No. 742,699

5 Claims. (Cl. 331—2)

(Granted under Title 35, U.S. Code (1952), sec. 266)

The invention described herein may be manufactered and used by or for the Government for governmental purposes, without the payment of any royalty thereon.

This invention relates generally to stabilizing systems, and more particularly to a novel system for stabilizing the timing of an oscillator under the control of a second source of oscillations.

Frequency standards of the quantum mechanical resonance type, such as the Maser, have a frequency stability of a high order, but their output frequency is generally too high and their power output is extremely low, about $10^{-10}$ watts. These characteristics make it difficult to use ordinary frequency division methods to lower the frequency.

There are three general types of frequency control phase lock systems in use, namely, (1) the D.C. amplifier, microwave detector system, (2) the I.F. offset method, and (3) the I.F. modulation method. The D.C. system (1) presents, especially for the low Maser powers, all the difficulties of low frequency crystal noise in the mixer and of D.C. amplification. The offset method (2) is not very satisfactory because it requires a secondary stable source of reference oscillations. The modulation method (3) is not dependent on the stability of this source; it is, however, very critical in respect to power loss (due to the amplitude modulation) and presents very difficult isolation problems. This holds also for the D.C. method.

It is, therefore, a principal object of the invention to provide an improved system for locking the frequency of an oscillator having desired characteristics under the control of a source of oscillations having a higher stability.

It is a further object of the invention to provide a system of the above type in which the accuracy of control is independent of the stability of the source of reference oscillations which is a part of the system.

It is a further object of the invention to provide a phase shift detector system which is independent of the frequency stability of its source of reference phase used therewith.

In accordance with the present invention, stabilization is accomplished by means of a pair of phase lock channels controlled by a common reference oscillator, so that variation of the frequency of the reference oscillator will affect both channels equally and hence have no effect on the final output frequency.

The features of the invention which are believed to be novel are set forth with particularity in the appended claims. The invention itself, however, both as to its organization and method of operation, together with further objects and advantages thereof, may best be understood by reference to the following description taken in conjunction with the accompanying drawing, in which:

Figure 1:
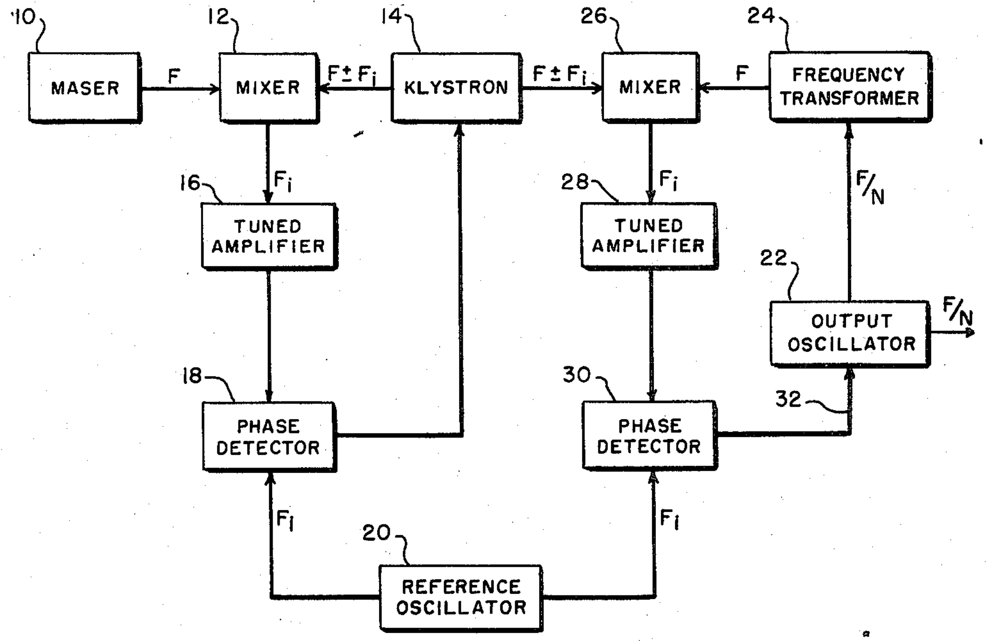
Fig. 1 is a block diagram of the invention.

In the drawing, the output of a frequency standard having excellent frequency stability, such as a Maser 10, operating at a frequency F, is mixed in a crystal mixer 12 with the output of a higher power tunable oscillator, such as a Klystron 14, normally tuned to a slightly different frequency $F \pm Fi$. The breat frequency $Fi$ is amplified by an amplifier 16, tuned to $Fi$. The output of the amplifier is applied to a phase detector 18 where it is compared with the phase of a signal from a reference oscillator 20 oscillating at a frequency $Fi$.

If the frequency of Klystron 14 departs from the frequency $F \pm Fi$, the beat frequency applied to detector 18 will change by the same amount and the detector 18 will yield a direct current voltage, which may be amplified if necessary, and applied to a frequency controlling element of the Klystron, such as the repeller electrode. The amplitude and direction of this voltage is such as to restore the frequency of the Klystron to a frequency $F \pm Fi$, or at least bring said frequency closer to $F \pm Fi$. The operation of this portion of the system is conventional.

The stabilized frequency of Klystron 14 is also applied to a second frequency control channel for stabilizing the frequency of an output oscillator 22 having the desired power output and a frequency $F/N$, where N is the desired submultiple of the Maser frequency.

Figure 2:
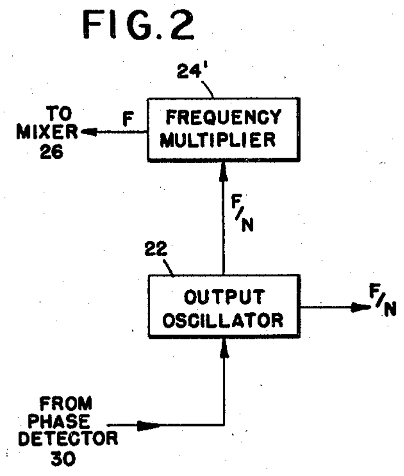
Figs. 2 and 3 illustrate modifications of the block diagram shown in Fig. 1 wherein the frequency transformer in Fig. 1 is respectively replaced in Figs. 2 and 3 by a frequency multiplier and a frequency synthesizer.
Figure 3:
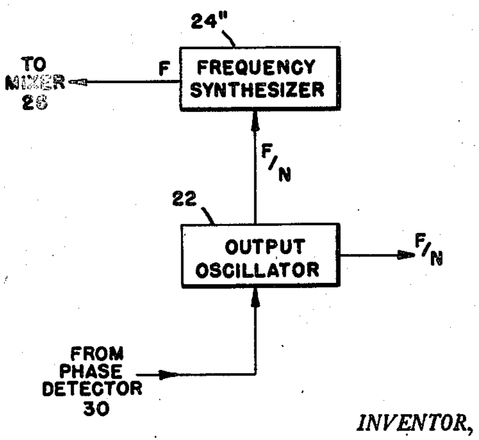

The frequency of oscillator 22 is multiplied N times by a frequency transformer 24 to derive a frequency equal to F. It should be noted that N need not be an integer. If it is, then frequency transformer 24 can be a frequency multiplier, 24′ in Fig. 2, for deriving the $N$th harmonic of the output of oscillator 22, or the $N$th harmonic of this oscillator can be selected directly therefrom. If N is not an integer, then frequency transformer 24 can be a conventional frequency synthesizer as shown at 24″ in Fig. 3, in which various combinations of the ouputs of harmonic and subharmonic generators excited by oscillator 22 are combined to derive the frequency F. The output frequency F of frequency transformer 24 is applied to a second mixer 26, to which is also applied the Klystron frequency $F \pm Fi$. The beat frequency $Fi$ in the output of mixer 26 is then amplified by a tuned amplifier 28 and then applied to a phase detector 30 where it is compared with the output of the same oscillator 20 that serves as a reference oscillator for detector 18.

In the event that oscillator 22 shifts from the desired frequency $F/N$, the frequency $Fi$ at phase detector 30 will shift, and the phase detector will produce an output voltage having an amplitude and phase which is representative of the amount and direction of said shift. This output is then applied through a lead 32 to a frequency controlling element of oscillator 22, which retunes it until the frequency $F/N$ is restored, at which time the output of detector 30 is zero.

Phase detectors 18 and 30 may be of the type shown in the U.S. patent of Pomeroy, No. 2,288,025. This patent also shows a type of controlled oscillator circuit which may be used in place of Klystron 30 if lower frequencies are involved.

The use of two channels controlled by the same reference oscillator, i.e., oscillator 20, eliminates the requirement of extreme frequency stability in this oscillator. For, if oscillator 20 drifts to a frequency $Fi+\Delta F$, phase detector 18 will produce an error output which will vary the frequency of Klystron 14 by the same amount, whereby the beat frequency output of mixer 12 will also be $Fi+\Delta F$. Similarly, the output of mixer 26 will also be $Fi+\Delta F$, so that no error output will appear at detector 30. Thus any shift in the frequency of reference oscillator 20 is self-compensating and is prevented from affecting the frequency of output oscillator 22. To insure this, detector 30 is made slower acting than detector 18. This can be done in the usual manner by providing a longer time constant in the output circuit of detector 30.

Because of the self-compensating feature above mentioned, oscillator 20 need not be very stable in frequency. However, the poorer its stability the wider the band pass that must be provided in amplifiers 16 and 28. It is therefore desirable to make oscillator 20 of the precision crystal type, whereby amplifiers 16 and 28 may be more sharply tuned to the frequency F*i*, thus reducing the effects of noise.

In a practical embodiment of the invention, Maser 10 operated at a frequency F of 23,870.130 megacycles. Klystron 14 operated at a 30 megacycle higher frequency, whereby the beat frequency F*i* was 30 megacycles, and this was also the frequency of oscillator 20. Output oscillator 22 operated at a frequency $F/N$ of 497.29438 megacycles, N being equal to 48, i.e., the output oscillator was tuned to the 48th subharmonic of the Maser frequency. Frequency transformer was a frequency multiplier which multiplied the output frequency by 48.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A system for locking the timing of a first source of oscillations to that of a second source of oscillations, comprising: a third source of oscillations; a first frequency control channel comprising a mixer for heterodyning the outputs of said second and third sources to provide a beat frequency output, and a phase detector coupled to the output of said mixer; a second frequency control channel comprising a mixer for heterodyning the outputs of said first and third sources to provide a beat frequency output, and a phase detector coupled to the output of said mixer; a common source of reference oscillations coupled to the phase detectors of both frequency control channels; each of said phase detectors providing an output representative of a shift in the phase of the beat frequency applied thereto relative to the phase of said reference oscillations; means controlled by the output of the phase detector in said first frequency control channel for maintaining said third source tuned to a frequency at which the phase of the beat frequency in said first frequency control channel has a predetermined relationship to the phase of said reference oscillations; and means controlled by the output of the phase detector of said second frequency control channel for maintaining said first source tuned to a frequency at which the phase of the beat frequency in said second control channel has a predetermined relationship to the phase of said reference oscillations.

2. A system for locking the frequency of a first oscillator under the control of a second oscillator having a higher frequency of considerable higher stability, comprising a third oscillator having a frequency slightly displaced from that of said second oscillator; a first frequency control channel comprising a mixer for heterodyning the outputs of said second and third oscillators to provide a beat frequency output, and a phase detector coupled to the output of said mixer; frequency transforming means for deriving from said first oscillator a frequency equal to that of said second oscillator; a second frequency control channel comprising a mixer coupled to the outputs of said frequency transforming means and said third oscillator for heterodyning the outputs thereof to provide a beat frequency output, and a phase detector coupled to the output of said mixer; a common source of reference oscillations of a frequency equal to said beat frequency coupled to the phase detectors of both frequency control channels; each of said phase detectors providing an output representative of a shift in the phase of the beat frequency applied thereto relative to the phase of said reference oscillations; means responsive to the output of the phase detector in said first frequency control channel for maintaining said third oscillator tuned to a frequency at which the beat frequency in each of said frequency control channels equals the frequency of said reference oscillations; and means coupled to the output of the phase detector of said second frequency control channel for maintaining the frequency of said first oscillator locked to the frequency of said second oscillator.

3. A frequency stabilizing system for stabilizing the frequency $F/N$ of a first oscillator under the control of a second oscillator having a frequency F of considerably higher stability, comprising: a third oscillator having a frequency controlling element to tune it to a frequency $F \pm Fi$; a first frequency control channel comprising a mixer for heterodyning the outputs of said second and third oscillators to provide a beat frequency output F*i*, an amplifier coupled to the output of said mixer and tuned to said beat frequency, and a phase detector coupled to the output of said amplifier; frequency transforming means for multiplying by N the output of said first oscillator to provide a frequency F; a second frequency control channel comprising a mixer coupled to the outputs of said frequency transforming means and said third oscillator for heterodyning the outputs thereof to provide a beat frequency output F*i*, an amplifier coupled to the output of said mixer and tuned to said beat frequency, and a phase detector coupled to the output of said amplifier; a common source of reference oscillations of a frequency F*i* coupled to the phase detectors of both frequency control channels, each of said phase detectors providing an output representative of a shift in the phase of the beat frequency F*i* applied thereto relative to the phase of said reference oscillations; means coupling the output of the phase detector in said first frequency control channel to the frequency controlling element of said third oscillator for maintaining said third oscillator tuned to a frequency at which the beat frequency in both of said frequency control channels equals the frequency of said reference oscillations; and means coupling the output of the phase detector of said second frequency control channel to said first oscillator for maintaining the frequency thereof equal to $F/N$.

4. A frequency stabilizing system as set forth in claim 3, wherein N is an integer and wherein said frequency transforming circuit is a frequency multiplier.

5. A frequency stabilizing circuit as set forth in claim 3, wherein said frequency transforming circuit is a frequency synthesizer.

References Cited in the file of this patent

UNITED STATES PATENTS

| | | |
|---|---|---|
| 2,206,695 | Guanella | July 2, 1940 |
| 2,435,259 | Wilder et al. | Feb. 3, 1948 |
| 2,662,181 | Hugenholtz | Dec. 8, 1953 |